T. E. MURRAY.
PROTECTIVE SWITCH BOX.
APPLICATION FILED OCT. 21, 1913.
1,115,091.
Patented Oct. 27, 1914.
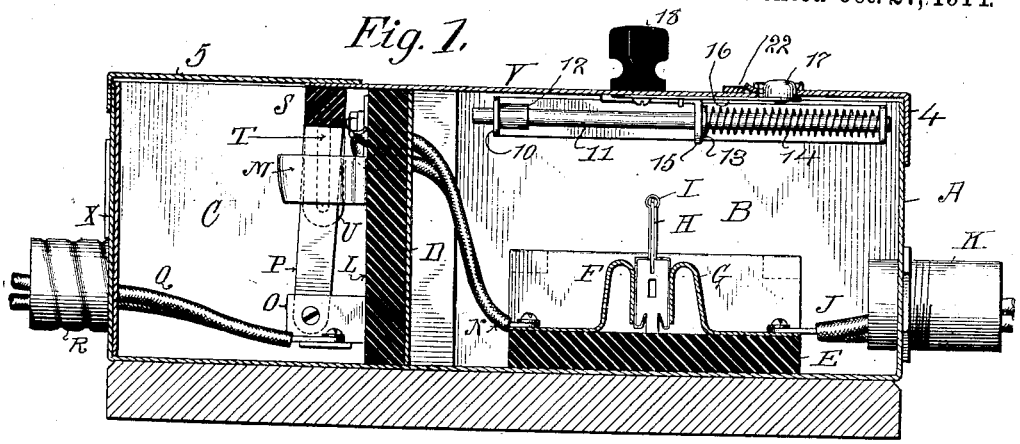
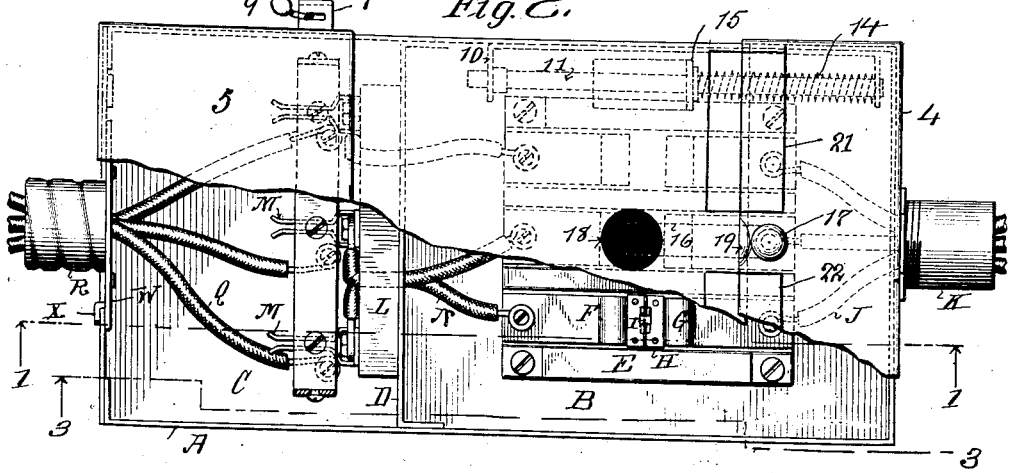
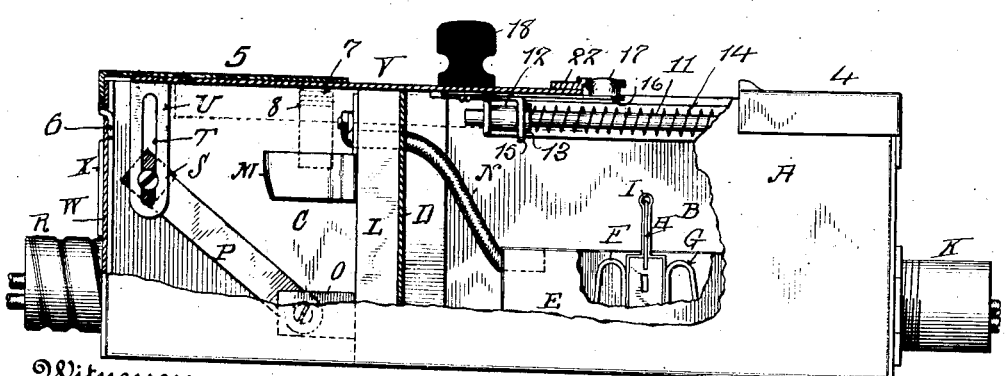
Witnesses:
Inventor
Thomas E. Murray
By his Attorney

UNITED STATES PATENT OFFICE.

THOMAS E. MURRAY, OF NEW YORK, N. Y.

PROTECTIVE SWITCH-BOX.

1,115,091. Specification of Letters Patent. Patented Oct. 27, 1914.

Application filed October 21, 1913. Serial No. 796,423.

*To all whom it may concern:*

Be it known that I, THOMAS E. MURRAY, a citizen of the United States, residing at New York, in the county of New York and State of New York, have invented a certain new and useful Improvement in Protective Switch-Boxes, of which the following is a specification.

The invention is a protective switch box, so constructed that the opening of a compartment in order to obtain access to circuit connections therein actuates a switch inaccessibly inclosed in a second compartment to break circuit in said connections.

In the accompanying drawings—Figure 1 is a longitudinal section of my protective switch box on the line 1, 1 of Fig. 2, showing position of parts when the circuit is closed and the sliding cover shut. Fig. 2 is a top view under similar conditions, a part of the cover being broken away. Fig. 3 is a side elevation and partial section on line 3, 3 of Fig. 2.

Similar numbers and letters of reference indicate like parts.

The box A is preferably of sheet metal and is divided into two compartments B, C, by the transverse partition D. In compartment B and on the bottom of the box is secured a base block E of insulating material having on its upper side three channels, in each of which is a pair of spring contact clips F, G which receive the fuse plugs H. Each plug H comprises a body portion and a thin upwardly projecting plate. The fuse strip I is bent over the upper edge of the thin plate and extends over both sides of the body portion, so that when said plug is inserted between the contact clips, circuit is established through said strip. Any other fuse plug may be used which will close circuit between the clips in like manner, and the three plugs disposed in the three pair of clips may be all alike. Similar members G of each pair of clips are respectively connected to circuit leads J which pass out of the box through a threaded tube K, secured in an end wall of said box in any suitable way.

In compartment C there is a plate L of insulating material secured to partition D. Said plate carries three pair of horizontally disposed contact clips M, to which are connected insulated wires N which after passing through partition D and plate L are respectively secured to members F of the clips F, G. On the lower portion of the plate L are three brackets O, on which are pivoted switch bars P which coöperate with the clips M. Said brackets are connected to circuit leads Q which pass out of the box through a tube R.

The tube R is mounted in a plate W which is provided with ways X which receive the edges of a vertical recess in the end wall of the box, so that said plate W may be removed from the recess.

The switch bars P are connected at their upper ends in any suitable way to a cross bar S of insulating material, and said bar at its ends is pivoted in the slots T in arms U, which arms are preferably formed integral with the sliding cover plate V. The side flanges of said plate lap over the upper edges of the side walls of the box. The arms U which are parallel to said flanges do not lap over said edges but extend downwardly within the box.

The sliding cover plate V rests upon the upper edges of the box and is movable longitudinally under the overlapping cover plates 4, 5 which are disposed at opposite ends of the box. Plate 4 is fixed permanently in place. On the end flanges of plate 5 are bent tongues 6, Fig. 3, which are inserted in slots in the end wall of the box. A lug 7 on one of the side flanges of plate 5 registers with a fixed lug 8 on the outside of the box. The shackle of a seal fastening 9, Fig. 2, is inserted through openings in said lugs. Cover plate 5 being thus locked in place by tongues 6, seal fastening 9 in turn locks slide W in its recess in the box wall.

Within the box and on one of the side walls thereof is secured a bracket 10, in which is a fixed rod 11. At one end of the rod is a collar 12. On said rod is a slidable washer 13, between which and the bracket 10 is interposed a helical spring 14. The rod 11 is received between the arms of a yoke 15 fixed on the lower side of the sliding cover plate V. Also on the lower side of plate V is a leaf spring 16 which carries an upwardly projecting button 17, and on the upper side of said plate is an operating handle 18.

The normal condition of the device is as shown in Fig. 1. The sliding cover plate V then closes the opening between the cover plates 4, 5 and prevents access to the fuse carriers and connections in compartment B.

and also through its slotted arm U moves the switch bars P into the contact clips M, thus closing circuit from leads Q through said bars and clips, to wires N, fuses H and leads J. The spring 14 is now compressed by yoke 15, but is prevented from throwing back cover plate V by the button 17 which enters an opening in cover plate 4, the button and its supporting spring 16 thus forming a latch.

When access to compartment B is desired, button 17 is pressed down by the operator, thus releasing the latch. The cover plate V may then be moved by its handle 15 into the position shown in Fig. 3, the expanding spring 14 assisting this movement: or, if desired, the spring 14 may be made strong enough quickly to throw back the plate V, without manual assistance from the operator. By reason of the movement of cover plate V to the position of Fig. 3, the switch bars P are removed from clips M, and the circuit is thus broken. The box now being open, the fuse plugs H may be reached for adjustment or removal, as may be desired. When the cover plate V is returned to its closed position, the button 17 runs under an indentation 19 in the edge of plate 4, said indentation having an inclined surface so that the button is gradually depressed before it reaches the opening in plate 4 and by its spring 16 is thrown into said opening. When the cover plate V is in closed position, two plates 21, 22 secured on its upper side lap over the plate 4, thus preventing the insertion of a blade under said plate for the purpose of raising the same to obtain improper access to compartment B. It will be observed that access cannot be had to compartment B at any time, unless the seal fastening first be destroyed, so that the switch is thus inaccessibly inclosed. When the cover plate V is in closed position, the circuit is established and access cannot be had to either compartment B or C. When the cover plate is moved to open compartment B, the circuit is, at the same time, broken in compartment C. Hence the fuses and exposed connections in compartment B are dead and can be safely handled, and, of course, it is impossible to steal current from said exposed connections. There is no way of establishing circuit while compartment B is opened, since no access can be had to compartment C.

I claim:

1. A protective connection box divided into two compartments, a switch inclosed in one of said compartments, a sliding cover for opening and closing the other compartment, a retracting spring for said cover, a latch for holding said cover in closed position, and means actuated by said cover for operating said switch.

2. A protective connection box divided into two compartments, two fixed covers separated from one another and disposed at opposite ends of said box, a sliding cover between said fixed covers and the walls of said box, closing the opening between said fixed covers and retractable into one of said compartments, circuit connections extending through said compartments, and a switch interposed in said connections, located in the compartment receiving the retracted cover, connected to said cover and moved by said cover to open circuit upon the retraction of said cover.

3. A protective connection box divided into two compartments, two fixed covers separated from one another and disposed at opposite ends of said box, a sliding cover between said fixed covers and the walls of said box, closing the opening between said fixed covers and retractable into one of said compartments, circuit connections extending through said compartments, a retracting spring for said cover, a latch on said cover engaging in an opening in one of said fixed covers, and a switch interposed in said connections, located in the compartment receiving the retracted cover, connected to said cover and moved by said cover to open circuit upon the retraction of said cover.

In testimony whereof I have affixed my signature in presence of two witnesses.

THOMAS E. MURRAY.

Witnesses:
GERTRUDE T. PORTER,
MAY T. McGARRY.